W. L. WATERS.
HEATING APPARATUS.
APPLICATION FILED MAR. 6, 1914.

1,183,926.

Patented May 23, 1916.

Witnesses:
Leonard W. Novander
Leonard E. Bogue

Inventor
William L. Waters
By Brown, Williams, Bell, Hanson & Boettcher
Attorneys

THE COLUMBIA PLANOGRAPH CO., WASHINGTON, D. C.

UNITED STATES PATENT OFFICE.

WILLIAM L. WATERS, OF MILWAUKEE, WISCONSIN.

HEATING APPARATUS.

1,183,926.  Specification of Letters Patent.  Patented May 23, 1916.

Application filed March 6, 1914. Serial No. 822,798.

*To all whom it may concern:*

Be it known that I, WILLIAM L. WATERS, a citizen of the United States, residing at Milwaukee, in the county of Milwaukee and State of Wisconsin, have invented certain new and useful Improvements in Heating Apparatus, of which the following is a full, clear, concise, and exact description, reference being had to the accompanying drawings, forming a part of this specification.

My invention relates to heating apparatus and has as its object an improved arrangement for heating.

My invention is of great utility in connection with ovens, and the parts are so constructed that the heating medium is disposed preferably between two layers of material which are of different heat conductivity, and thus different proportions of heat will be conducted through each layer of material. Any heating agent might be employed but for the purposes of disclosing my invention I shall describe an electrical device.

In baking, it is desirable that the heat coming from the top and bottom of the oven be very carefully proportioned so as to properly bake the articles in the oven. My invention contemplates an arrangement of the heat-conducting members whereby the heat is radiated from the surfaces thereof into the ovens in such a way as to produce the best results.

My invention will be better understood by reference to the accompanying drawings, in which—

Figure 1:
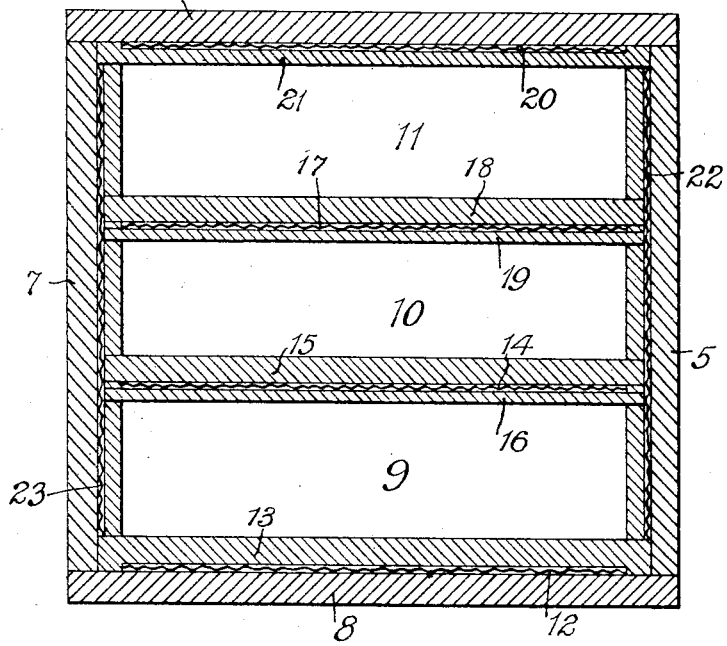
Figure 3:
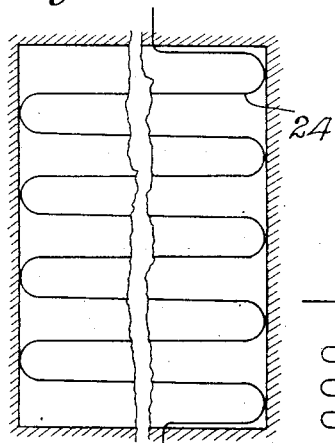
Figure 2:
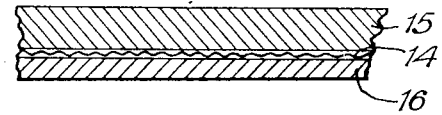
Figure 4:
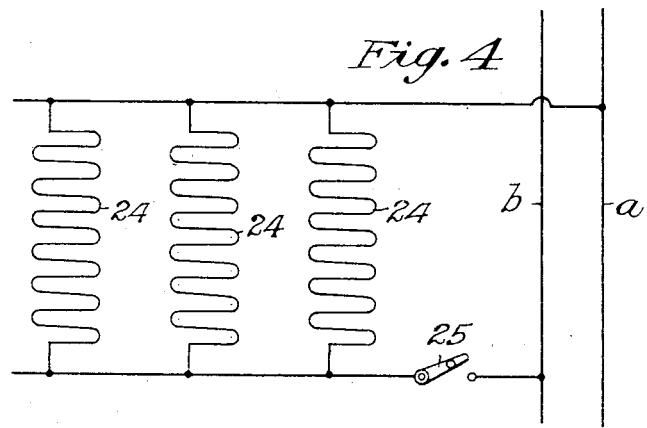

Figure 1 is a cross-sectional view of a heating apparatus embodying the principles of my invention; Fig. 2 is an enlarged cross-sectional view of the intermediate sections shown in Fig. 1; Fig. 3 is a plan view of one of the heating elements, and Fig. 4 illustrates diagrammatically a plurality of heating elements connected in multiple to a source of power.

As shown in Fig. 1, the outside members 5, 6, 7 and 8 are made of heat insulating material such as magnesia and similar substances, and are held together in any suitable manner. These members form the oven compartments 9, 10 and 11. The electric heating element 12 supplies heat to the bottom of the oven compartment 9 through the plate 13, and the heater 14 supplies heat to the bottom of the oven compartment 10 through the plate 15 disposed directly above the heater. This element 14 also conducts heat downward into the oven 9 through the member 16, disposed directly below the heater. The heater 17 supplies heat to the oven compartments 10 and 11 through the members 18 and 19, disposed on opposite sides of the heater. The heater 20 conducts heat through the member 21 and into the oven 11.

As is apparent to those skilled in the art, it is necessary that the heat delivered to any given oven compartment be properly proportioned as to that supplied from above and from below. In order to secure this proper proportioning of heat it has been customary in the prior art to provide two heaters; for instance—one to heat the bottom of the upper compartment, and the other to heat the top of the lower compartment, and the heaters were relatively selected to produce the proper amounts of heat. According to my invention however, one heating element suffices, since I secure the proper proportioning of the heat delivered above and below by selecting the proper relative characteristics of the conducting plates between which the element is disposed. Thus, the plates 15 and 16 may have different coefficients of conductivity or they may be made of different thickness so that the amount of heat conducted in one case will differ from that in the other, with the corresponding difference in heat radiation and conduction into the compartments. Thus, where articles to be baked are placed on the plate 15—for example—the amount of heat emanating from the plate 15 is properly limited so as not to burn the article, since the heat is transmitted by conduction; but on the other hand, the plate 16, and correspondingly the plate 19, are made of comparatively high conductivity, since the heat is transmitted by radiation and the relatively high conductivity becomes necessary in order to secure the uniform influence on all sides of the articles to be baked. It will be understood of course, that the parts 14, 15 and 16 are analogous to the parts 17, 18 and 19 in structure, operation and result.

In addition to the above-described heaters, it is of great advantage to supply side heaters, and to this end I have arranged the heaters 22 and 23 to conduct heat through the side plates into all of the ovens. The heating medium in each instance may consist of a coil of wire 24, as shown in Fig. 3, the two terminals of which are connected to a suitable source of power. In Fig. 4 the heating elements 24, 24 are shown as being connected in multiple to the line wires *a* and *b* and a switch 25 is employed to turn off the power when necessary.

It is apparent from the above description that I can construct a heating apparatus in such a way as to employ a minimum number of heating elements in conjunction with layers of material adjacent to such elements and whose heat conductivities are arranged to suit any condition—that is to say, it is always possible with my invention to govern the amount of heat which will be delivered into any given compartment.

It will be apparent to those skilled in the art that modifications may be made without departing from the spirit and scope of my invention.

I claim as new, and desire to secure by Letters Patent of the United States:

1. In a heating apparatus, a combination of a heating medium, heat conducting members of different heat conductivity disposed on opposite sides of said heating medium and in contact therewith, said heat conducting members having each a working surface whereby heating surfaces giving off different quantities of heat per unit of time are provided and means for utilizing the heat given off by said working surfaces.

2. In a heating apparatus an electric resistance heating element, heat transmitting members of various heat conductivity in contact with said heating element, said heat transmitting members exposing a plurality of working surfaces giving off different quantities of heat per unit of time and means for utilizing the heat given off by said working surfaces.

3. In heating apparatus, the combination of an electric heating means, substantially surrounding a compartment, and adjacent members of different heat conducting characteristics arranged so as to determine the relative flow of heat in different directions within said compartment.

4. In a heater, a plurality of compartments, a heating element between said compartments, and heat-conducting plates on each side of said element, said heat-conducting plates differing in conductivity characteristics so that more heat will be conducted in one direction than in the other.

5. In a heating apparatus, the combination of outside heat insulating members forming a compartment, a partition in said compartment, said partition having a heating element, and a layer of heat-conducting material on each side of said element, said layers of heat-conducting material differing in conductivity to proportion the radiation and conduction of heat below and above.

6. In a heating apparatus, the combination of outside heat insulating members forming a compartment, a partition in said compartment, said partition having a heating element, a layer of material above said heating element of comparatively low heat conductivity, and a layer of material below said heating element of comparatively high heat conductivity.

7. In a heating apparatus an electric heating medium of substantially uniform heating capacity surrounding an object to be heated, heat transmitting material in contact with said heating medium, said material having areas of different heat transmissibility to determine the direction of greatest heat transmission to said object.

8. In a heating apparatus, a closed heating chamber, a transverse wall dividing said chamber into compartments said wall having a heating element therein and having heat conducting media of different heat conductivity on the sides of said heating element whereby heating surfaces for giving off heat at different rates are provided in said chamber.

In witness whereof, I hereunto subscribe my name this 25th day of February, A. D. 1914.

WILLIAM L. WATERS.

Witnesses:
  O. W. CAMPBELL,
  E. A. MOLENSKE.

Copies of this patent may be obtained for five cents each, by addressing the "Commissioner of Patents, Washington, D. C."